United States Patent
Devendran et al.

(10) Patent No.: US 11,960,841 B2
(45) Date of Patent: Apr. 16, 2024

(54) INCOMPLETE PROBLEM DESCRIPTION DETERMINATION FOR VIRTUAL ASSISTANT USER INPUT HANDLING

(71) Applicant: KYNDRYL, INC.

(72) Inventors: Saravanan Devendran, Bangalore (IN); Aditya M. Burli, Bangalore (IN); Dennis Anthony Perpetua, Jr., Jay, NY (US)

(73) Assignee: Kyndryl, Inc., New York, NY (US)

( * ) Notice: Subject to any disclaimer, the term of this patent is extended or adjusted under 35 U.S.C. 154(b) by 331 days.

(21) Appl. No.: 17/463,469

(22) Filed: Aug. 31, 2021

(65) Prior Publication Data

US 2023/0067274 A1  Mar. 2, 2023

(51) Int. Cl.

| | |
|---|---|
| *G06F 40/289* | (2020.01) |
| *G06F 11/30* | (2006.01) |
| *G06F 11/34* | (2006.01) |
| *G06N 20/00* | (2019.01) |
| *G10L 15/06* | (2013.01) |
| *G10L 15/18* | (2013.01) |

(52) U.S. Cl.
CPC .......... *G06F 40/289* (2020.01); *G06F 11/302* (2013.01); *G06F 11/3438* (2013.01); *G06N 20/00* (2019.01); *G10L 15/063* (2013.01); *G10L 15/18* (2013.01)

(58) Field of Classification Search
CPC .. G06F 40/289; G06F 11/302; G06F 11/3438; G06F 40/35; G06N 20/00; G06N 3/09; G06N 3/084; G06N 3/006; G06N 3/0442; G06N 3/0455; G10L 15/063; G10L 15/18; H04L 51/02
See application file for complete search history.

(56) References Cited

U.S. PATENT DOCUMENTS

| | | | |
|---|---|---|---|
| 9,798,799 B2 * | 10/2017 | Wolverton | .............. G10L 15/22 |
| 10,726,203 B2 * | 7/2020 | Zakharov | ............ G06F 16/3347 |
| 2012/0016678 A1 | 1/2012 | Gruber et al. | |

(Continued)

OTHER PUBLICATIONS

Anonymous, "A method of cognitive support through chatbot", IP.com No. IPCOM000263369D, Aug. 25, 2020, 6 pgs.

(Continued)

*Primary Examiner* — Linda Wong
(74) *Attorney, Agent, or Firm* — Erik Swanson; Andrew M. Calderon; Calderon Safran & Cole, P.C.

(57) ABSTRACT

User input handling by a virtual assistant includes receiving a sequence of natural language statements provided by a user to a virtual assistant, applying a cognitive model to the sequence of statements and determining whether the sequence of statements provides a complete problem description, by the user, to which the virtual assistant is to respond in assisting the user address a problem that the user experiences, prompting the user to provide an additional one or more statements to complete the problem description, based on completing the problem description, formulating and providing a response to the user based on a determined intent of the complete problem description, and monitoring input by the user based on providing the response, the input informing feedback for further training of the cognitive model to identify whether statement sequences provide complete or incomplete problem descriptions.

20 Claims, 7 Drawing Sheets

(56) References Cited

U.S. PATENT DOCUMENTS

| | | |
|---|---|---|
| 2014/0365226 A1 | 12/2014 | Sinha |
| 2018/0246878 A1 | 8/2018 | Bailey et al. |
| 2019/0236130 A1* | 8/2019 | Li .......................... G10L 15/22 |
| 2020/0058295 A1 | 2/2020 | Debnath et al. |
| 2020/0302926 A1 | 9/2020 | Aggarwal et al. |

OTHER PUBLICATIONS

Mani, A., "Solving Text Imputation Using Recurrent Neural Networks", published in: semanticscholar, 2015, 7 pgs.

Mell, Peter, et al., "The NIST Definition of Cloud Computing", NIST Special Publication 800-145, Sep. 2011, Gaithersburg, MD, 7 pgs.

* cited by examiner

INCOMPLETE PROBLEM DESCRIPTION DETERMINATION FOR VIRTUAL ASSISTANT USER INPUT HANDLING

BACKGROUND

Consumer computing devices, such as workstations, smartphones, tablets, home smart speakers, and others provide facilities for human users to interact with AI and computer-based virtual agents, chat bots, or "digital assistants" (collectively referred to herein as "virtual assistants") that attempt to identify user-provided text or voice input and assist with a variety of tasks. To function, the input is typically transmitted over the Internet for backend processing, including language processing, recognition of intents, and response formulation using artificial intelligence techniques. Ultimately, a response is usually to be provided back to the user.

SUMMARY

Shortcomings of the prior art are overcome and additional advantages are provided through the provision of a computer-implemented method. The method receives a sequence of natural language statements provided by a user to a virtual assistant. The method applies a cognitive model to the sequence of statements and determines whether the sequence of statements provides a complete problem description, by the user, to which the virtual assistant is to respond in assisting the user address a problem that the user experiences. The method also prompts the user to provide an additional one or more statements to complete the problem description. Based on completing the problem description, the method formulates and provides a response to the user based on a determined intent of the complete problem description. In addition, the method monitors input by the user based on providing the response, the input informing feedback for further training of the cognitive model to identify whether statement sequences provide complete or incomplete problem descriptions.

Further, a computer system is provided that includes a memory and a processor in communication with the memory, wherein the computer system is configured to perform a method. The method receives a sequence of natural language statements provided by a user to a virtual assistant. The method applies a cognitive model to the sequence of statements and determines whether the sequence of statements provides a complete problem description, by the user, to which the virtual assistant is to respond in assisting the user address a problem that the user experiences. The method also prompts the user to provide an additional one or more statements to complete the problem description. Based on completing the problem description, the method formulates and provides a response to the user based on a determined intent of the complete problem description. In addition, the method monitors input by the user based on providing the response, the input informing feedback for further training of the cognitive model to identify whether statement sequences provide complete or incomplete problem descriptions.

Yet further, a computer program product including a computer readable storage medium readable by a processing circuit and storing instructions for execution by the processing circuit is provided for performing a method. The method receives a sequence of natural language statements provided by a user to a virtual assistant. The method applies a cognitive model to the sequence of statements and determines whether the sequence of statements provides a complete problem description, by the user, to which the virtual assistant is to respond in assisting the user address a problem that the user experiences. The method also prompts the user to provide an additional one or more statements to complete the problem description. Based on completing the problem description, the method formulates and provides a response to the user based on a determined intent of the complete problem description. In addition, the method monitors input by the user based on providing the response, the input informing feedback for further training of the cognitive model to identify whether statement sequences provide complete or incomplete problem descriptions.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
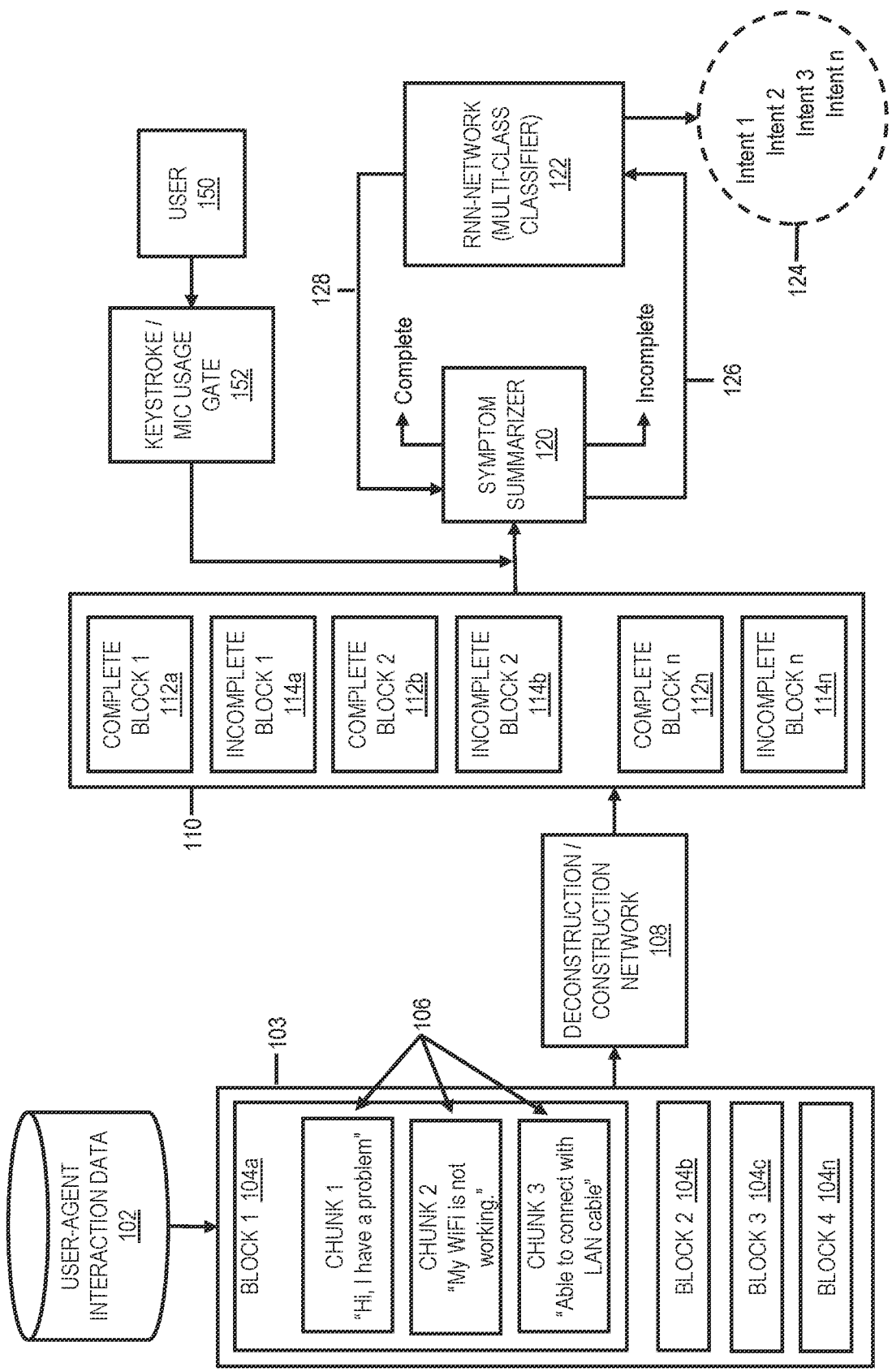
FIG. 1 depicts an example conceptual diagram of an approach for identifying incomplete problem descriptions in accordance with aspects described herein.

Described herein are approaches for user input handling by virtual assistants, including identification of incomplete problem descriptions provided thereto. Examples are presented herein with reference to virtual assistants providing helpdesk functions to assist a user in addressing a problem, though aspects described herein apply more broadly to other types of virtual assistants assisting with a variety of other problems. Identifying whether a problem description provides a complete problem description will enable the virtual assistant to identify whether/when to solicit additional information from the user in order to better understand the problem, and ultimately to better assist the user.

One challenge faced by virtual assistants is understanding sequences of statements provided by a user and particularly whether the user has provided enough detail to present a problem description that is robust enough for the virtual assistant to effectively address the user's request. A user typically conveys information, such as a request for help, in the form of text and/or audio (voice) using one or more sentences to describe an issue the user is facing. For example, if a user recognizes that the user's wireless internet (WiFi) connection is not working, the user might begin a chat with a virtual agent over the phone, text messaging, a browser, a virtual assistant, etc. and provide the following natural language statements as input in text/voice form:

"Hi.

I have a problem.

After restarting my computer, I tried connecting to the office WiFi. But it failed. It used to work properly.

Can you help me fix this issue?"

The above presents a sequence of statements. Statements are phrases (collections/chunks of words) or full sentences with or without punctuation. A sequence of statements (which is referred to herein as a "block", "statement bock" or "block of statements") could be a sentence or a collection of sentences. In the case of keystroke input, the user has pressed the return key (new line) and/or provided these statements in a series of text or other messages. In the case of voice input, the user may have paused for a relatively short amount of time between each of the statements. In either case, the user may have provided the above to the virtual assistant in segments, for instance the four segments in the example above. The short pauses of time may be interpreted to delineate between separate discrete requests, though in many cases a user provides multiple statements, with short pauses in between, all related to the same request for assistance.

A human agent when listening to or reading a sequence of statements can usually easily recognize that the providing user has not finished typing/saying the description of the problem. The agent would wait for this to complete even though multiple statements may have already been provided. Virtual assistants, however, tend to process to some extent every statement provided, which could prematurely produce irrelevant responses back to the user even in cases that the user has not completed the description of the problem. This can adversely affect the user experience.

Conventional technology is lacking in this regard, as identification of incompleteness in literature sentence sequences, for instance, does not clearly apply to service desk knowledge domains, where input sentences often lack proper grammar.

Aspects described herein provide a methodology to identify incompleteness of problem descriptions in a sequence of natural language statements provided by a user to a virtual assistant and wait for/prompt the user to completely describe the problem before the assistant commences its processing to generate a response to the problem being described. In some aspects, a process identifies when the user actively continues with his or her input to describe the problem. Another aspect is the identification of incomplete problem descriptions in requests made by the user to a virtual assistant.

Initially, a process can train a cognitive model for classifying completeness of problem descriptions, i.e. identifying complete problem descriptions and incomplete problem descriptions. The process collects a data corpus with labelled problem descriptions, of which most are expected to be complete problem descriptions. In some examples, they may be summarizations of complete problem descriptions. The process can then generate both complete and incomplete blocks/statement sequences, which can then be used to build and train the cognitive model. Specifically, the corpus can be processed to break the input descriptions into statements/chunks of words and phrases and generate new statements/chunks of phrases. A statement can be a proper sentence or a sequence of words. Statements can be sequenced and grouped, with each group being referred to as a "block", and every block categorized into one or more intents. In this regard, each block can correspond to a general problem description, but the description might potentially have more than one intent. For instance, a block that includes the statement: "Internet access through my laptop's WiFi is not working" correlates to a problem statement that there might be no internet connection, but two very plausible intents from that block might be that (i) there is a problem with the laptop's WiFi network interface and/or (ii) there is a problem with the wireless access point in propagating that wireless network.

Various blocks representing the same or similar problem descriptions can be created, for instance "no internet connection" can be stated as "I cannot connect to example.com", "My WiFi is not working" and/or "I tried to connect to example.com but could not load the page", as examples. Recurrent neural networks (RNNs) can be used to train models to identify incomplete problem descriptions as well as classifiers that can classify possible intent(s) behind particular blocks, whether or not they provide complete problem descriptions.

A cognitive model for problem description completeness classification might indicate a confidence level of 90% that an input block of statements provides a complete problem description. Threshold(s) can be set to define what confidence level is needed to conclude/classify that a provided problem description is complete. Based on a complete problem description being provided by a block of statements and an identified intent of that block, the virtual assistant processing determines how to intelligently respond to the user's request.

As part of receiving text/voice input from a user, a process can monitor the input stream to recognize when a user has stopped providing additional statements and may be expecting a response. A system could, for example, monitor keystroke input and wait for the user to complete typing by waiting an appropriate amount of time between keystrokes. A trigger for determining whether the user provided a complete problem description can be lapse of a defined amount of time between user input, for instance an amount of time that the user has refrained from further typing or refrained from speaking additional voice input.

If the process identifies that that the user has ceased input for a defined amount of time, the process feeds the input statements to the cognitive model. If that cognitive model determines that the user-provided sequence of statements is incomplete insofar as providing a detailed-enough problem description, it could then respond with a message requesting the user to complete the problem description by providing additional statements that further describe the problem. These additional statements can be combined with the initial statements received to form a proper sequence of statements, which can then be analyzed to determine whether it provides a complete problem description.

There are also opportunities for continuous learning from the user's subsequent interaction with the virtual assistant after it has responded to a seemingly complete problem description. A sequence of sentences/statements typed or uttered after the system initially responds to the user can be useful to inform whether the system understood the user and/or provided a useful response. This feedback can be used to train the cognitive model that determines whether a block presents a complete problem description, and accordingly improve the accuracy of cognitive model. This feedback can therefore help to understand what the user is really attempting to express. The process can recognize that it failed to identify the statement "I can't connect to example- .com" as an incomplete problem description on the basis that the user followed up an initial response with additional statements like "But I can connect to other websites". This is valuable feedback to the cognitive model that 'can't connect to [website]' is an incomplete problem description.

FIG. 1 depicts an example conceptual diagram of an approach for identifying incomplete problem descriptions in accordance with aspects described herein. One aspect provides a supervised training approach that takes as input historical interaction data 102 as training data. Example historical interaction data is transcripts of interactions between users and human and/or virtual agents. This training interaction data is labeled, meaning different portions of the interactions are labeled as being a complete description of a problem or an incomplete description of a problem. As part of this, the interactions can be provided as a collection 103 of blocks 104a, 104b, 104c, . . . 104n. Each block is composed of a sequence of chunks 106 of words (statements, for instance sentences/phrases) that were received, though the input data may, in some instances, not clearly delineate between chunks of a block or even different blocks. A sequence of statements (i.e., a "block") is typically a collection of consecutive, uninterrupted, or successive statements that were provided by the user to an agent. Each block is considered a discrete interaction that can be potentially classified as (i) a complete description of a problem for purposes of virtual assistant AI processing to provide a response or (ii) an incomplete description of a problem for purposes of virtual assistant AI processing to provide a response. Typically the input training data would include a large collection of complete problems descriptions (and/or summarizations thereof), though there may be provided interactions that are labeled incomplete.

The blocks are fed into a deconstruction/construction network 108 that deconstruct the blocks into chunks for generation of statements that can be formed into a collection 110 of blocks of statements (primarily or at least in part including blocks that are incomplete problem descriptions) for training purposes. The collection 110 provides a new data set on which to train the cognitive model.

The collection 110 includes blocks that provide incomplete problem descriptions (i.e., 'incomplete blocks' 114a, 114b, . . . 114n) and optionally, as in the example of FIG. 1, blocks that provide complete problem descriptions (i.e. 'complete blocks' 112a, 112b, . . . 112n). In some examples, the complete blocks 112 are taken from the initial input data 102 as the blocks therein labeled complete, though it may be possible that the deconstruction/construction network 108 constructs new blocks (ones not included in the input data 102) that are nonetheless confidently taken to be complete problem descriptions. This may be possible when, for example, a complete block provided in the input data 102 contains extraneous or redundant statements/chunks that can be omitted from the input complete block without diminishing the completeness of the problem description, or when generated blocks contain statements that are sufficiently synonymous to those of a complete block so as to convey a problem description substantially the same as that of the complete block.

This collection 110 can be used to train a cognitive model that is configured to takes as input a sequence (block) of natural language statements and determine whether the sequence provides a complete problem description. This model can be part of/used by a symptom summarizer 120 that attempts to identify symptoms of a problem for purposes of responding with useful information.

A sequence of statements can be complete in terms of providing a description of a problem with which the virtual assistant might potentially assist, however the intent(s) of the expression of the problem description can vary, and that may be relevant in whether the virtual assistant can effectively address the problem that has been described. For instance, the sequence "I cannot connect to the internet through my laptop's WiFi but I am able to connect when using a LAN cable" might express a complete problem description for a virtual assistant to diagnose and address as an issue related to only WiFi (and not also the Ethernet connection), but the sequence expresses potentially multiple intents, for instance that the root problem exists with the laptop's wireless network interface, the wireless router, wireless interference in the environment, etc. Statement sequences can be forwarded-propagated 126 by the symptom summarizer 120 to a multi-class intent classifier to classify the intent(s) of a sequence into any of several intents 124 or potentially an unknown label. Sequences of both complete and incomplete problem descriptions can be provided to classifier 122 for intent classification.

Completeness/incompleteness of the sequence in terms of the problem description it provides can influence the intent classification by classifier 122. A problem description that is incomplete might be classified into too many possible intents and/or intent(s) for which the label confidence is so low that the system cannot meaningfully identify the issue that the user tried to express. A complete problem description, however, is expected to result in classification into one or more intents with a relatively high confidence that the problem is related to one or more of those intents, and therefore the system can meaningfully diagnose and address the problem.

The intent classification by classifier 122 can therefore influence the completeness classification that is part of the symptom summarizer 120. This influence is provided as back propagation 128 to the symptom summarizer. A sequence might be classified initially as an incomplete problem description but if the classifier 122 can identify one or two intents into which that sequence can be confidently classified such that the description is found to provide enough information for the system to address the problem(s), then an indication of this can be fed back to the symptom summarizer 120 to indicate that the sequence, initially classified by 120 as an incomplete problem description, should have been classified instead as a complete problem description. Conversely, when the classifier 122 the has trouble confidently classifying intent(s) of a sequence that the cognitive model indicated is complete in terms of a problem description, the classifier 122 could indicate back to symptom summarizer 120 that the sequence should not have been classified as a complete problem description because more information is needed from the user. The feedback 128 from the classifier 122 to the symptom summarizer 120 provides more training data that can improve the cognitive model's classification of sequences as complete or incomplete problem descriptions.

In addition, when the system identifies a complete problem description, selects an intent against which to diagnose, and provides a response to the user but the use indicates that the response provided is not adequate to address the problem or that the system did not correctly understand the problem, then this is useful feedback to the system for training purposes. The misclassification of the initial description as being complete when it really is not, as evidenced by a user's response, is useful additional training data (i.e., that it should have been properly labeled incomplete rather than complete), and thus any additional subsequent description provided by the user to further explain that problem can be added to the initial block of statements (that was discovered to be incomplete) to produce a complete problem description. The feedback is useful also for further training of the intent classifier, as it can serve as confirmation that an intent identified by classifier 122 was correct in helping to address the problem described by the user. In this manner, subsequent user interactions can confirm or rebut that the system (i) properly understood a sequence to provide a complete problem description and (ii) properly identified the intent(s) to address and provide meaningful, helpful feedback to the user in response to the conveyed problem.

In addition to initial and subsequent training of the cognitive engine and classifier, FIG. 1 demonstrates how new user interactions can be handled by this approach. A user 150 provides user input to symptom summarizer 120 via gate(s) 152. Gates are used to delineate between ongoing user input and user input that is completed insofar as when the user has stopped talking/typing and is waiting for a response. Gates help to define the completion of statement blocks. A process uses these to determine, based on a property of user input, whether the user continues to provide additional statements to be included in a sequence. If the user continues to provide statements for inclusion in the sequence, then the process can wait to apply the cognitive model (i.e. to determine whether the sequence provides a complete problem description) until it is determined that the user has concluded providing statements to be included in the sequence. One such property of the user input is an amount of time between inputs by the user. Lapse of a defined amount of time after the user has typed on a keyboard, for instance, or has spoken additional voice input without providing further keystrokes or voice input, can be taken to mean the user has concluded providing input of the user's request and is now waiting for a response. In a specific example, if a user stops typing or speaking to the virtual assistant for an uninterrupted 4 seconds, then this is taken to mean that the user no longer continues to provide statements to be included in the sequence of statements. At that point, the symptom summarizer 120 can use the cognitive engine (trained as explained above) to classify the sequence as to whether the sequence provides a complete problem description.

In some examples, the process determines whether the sequence provides a complete problem description and, if so, provides the sequence to the classifier 122 to determine intent(s) of the sequence, otherwise prompts the user to provide additional statements to include in the sequence and then reapply the cognitive engine to determine whether the updated sequence provides a complete problem description. This can repeat until the cognitive model determines the sequence provides a complete problem description. Optionally, even a sequence classified as an incomplete problem description can be provided to the intent classifier 122 in an attempt to confidently determine intent(s) thereof. If this is successful, this can be provided as feedback to the symptom summarizer 120 for further cognitive model training.

If the classifier 122 can determine with a threshold level of confidence one or more intents, then these can be provided to formulate and inform an initial substantive response to the user, for instance (using the example above) a suggestion to disable and reenable the user's WiFi adapter. How the user responds after the system presents an initial response to the problem description may be useful for training purposes as discussed above, e.g., feedback as to the reliability and accuracy of the cognitive model and classifier. If the classifier 122 is unable to confidently determine intent(s), then this can inform that the problem description is not complete, which can be indicated to the symptom summarizer for training purposes as well as to prompt the user to provide additional input to complete the problem description and help identify an intent that is to be processed.

Figure 2:
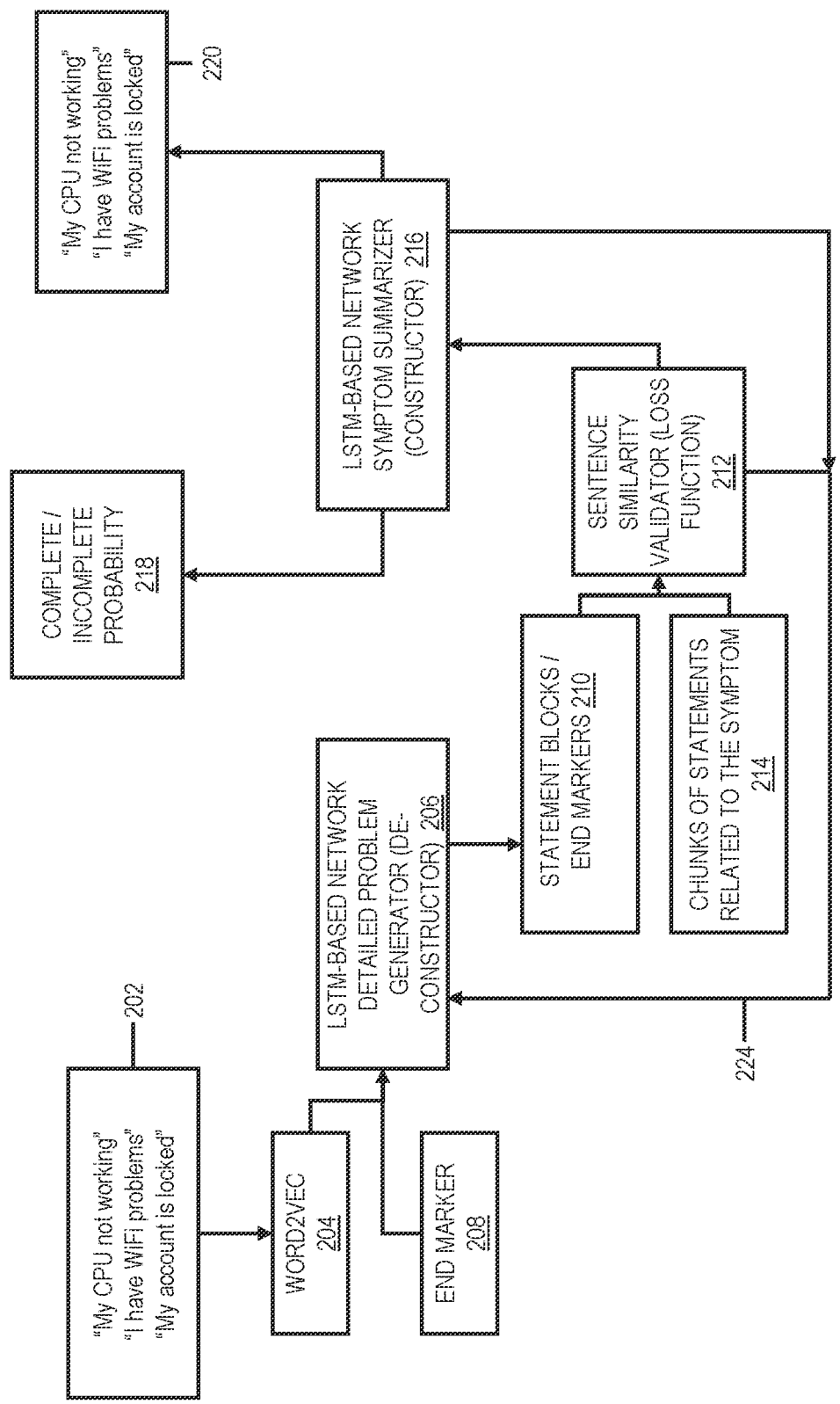
FIG. 2 presents an example conceptual model for generating a new dataset of problem descriptions in accordance with aspects described herein.

FIG. 2 presents an example conceptual model for generating a new dataset of problem descriptions in accordance with aspects described herein. Generally, the model centers around two components—a de-constructor network (206) and a constructor network (216). The de-constructor network 206 breaks down summaries of complete problem descriptions into chunks of words and phrases, including synonyms thereof. The chunks of words/phrases and synonyms are used to create new statement sequences and end markers, each corresponding to an input problem summary. These statements are passed to the constructor network 216 to form output blocks that are complete or incomplete in terms of their descriptions of the corresponding input problem descriptions. Accuracy of the entire network can be validated by comparing the input to the output.

Initially, input data 202 provides various original, complete problem descriptions (statement blocks providing complete problem descriptions) and summary statements of those problems, i.e. problem summaries. The summaries are fed into a natural language processing (NLP) component 204 for word embeddings, for instance analysis, synonym detection, and/or words/phrase suggestion to complete statements. An example such NLP component 204 is Word2vec. The output of the NLP component 204 is fed into a Long short-term memory (LSTM)-based network Detailed Problem Generator (De-constructor) 206 along with end markers 208 that define where to end statement sequences. End markers define the start and end of sequences, which might be complete or incomplete in terms of describing the problem based on which they were generated. The statement sequences and end markers are input to the de-constructor network 206. Operation of the de-constructor network 206 generates statement sequences, delineated by end markers, related to the input complete problem summaries 202 but that are, or may be, incomplete problem descriptions. The purpose of end markers is to provide a clear marker that communicates to the network the end of each block, i.e. each specific sequence of statement(s) that form a discrete block. Each block (of statements) is related to an input complete problem summary, though the block itself may be incomplete in terms of conveying the complete description of the problem. The de-constructor network 206 outputs, as 210, the created new statement sequences and end markers delineating between sequences.

Using the example block from above, "I cannot connect to the internet through my laptop's WIFI, but I am able to connect when using a LAN cable." provides a single-sentence block that constitutes a complete problem description, and the corresponding problem summary may be "I have WiFi problems". This input (202) can be provided via NLP component 204 to the de-constructor network 206 that breaks-down the problem summary and provides potentially several sequences, for example Block 1: {"I cannot connect to my internet via WIFI"}<End-Marker>; Block 2: {"I cannot connect to my internet", "Problem with my WIFI"}<End-Marker>; Block 3: {"I am not able to connect to internet", "I am able to connect using LAN", "But not able to connect using WIFI"}<End-Marker>; Block 4: {"I cannot connect to internet via WIFI", "But able to connect using LAN"}<End-Marker>; and Block 5: {"I have issue connecting internet when I am on WIFI", "No issues with connecting to internet through LAN"} <End-Marker>. Additionally or alternatively, blocks 210 could be created by omitting from some block of the input 202 one or more statements/phrases/chunks.

Each of the individual blocks may or may not be complete in terms of describing their corresponding problem. The de-constructor network 206 can produce several different blocks with varying degrees of completeness in terms of describing the original problem.

The statement blocks output from de-constructor 206 are fed into a sentence similarity validator (212) along with the statement sequences 214 that form the complete problems descriptions (e.g. from the input 202). The sentence similarity validator 212 compares how similar the output of the de-constructor 206 is to the original statement blocks of input 202, helping the de-constructor network 206 to learn to better de-construct the problem summaries into statement blocks. In a neural network, there is a cost or loss function that helps the network to learn. The sentence similarity validator ensures that, for instance, the statements of a given block generated from a problem summary are good enough in conveying they problem. Hence, there is a back-propagation 224 to the de-constructor network 206 to notify the de-constructor network 206 of the similarities between output blocks (generated from the problem summaries) and the input blocks that provide complete problem descriptions corresponding to those summaries.

The output of validator 212 is statement sequences (blocks) separated by end markers and provide incomplete (and potentially complete) problem descriptions. Using the example herein, example output may be: [Block 1] {"I am not able to connect to internet in my laptop"}, <End-Marker>, [Block 2] {"I cannot connect to internet in my laptop", "Through my WIFI"}, <End-Marker>, and [Block 3] {"I cannot connect to internet via WIFI", "But able to connect via LAN"}, <End-Marker>. Blocks 1 and 2 provide incomplete problem descriptions but Block 3 might confidently provide a complete problem description akin to the source input of "I cannot connect to the internet through my laptop's WIFI but I am able to connect when using a LAN cable".

An LSTM-based Network Symptom Summarizer (Constructor network) component 216 receives output from the sentence similarity validator 212 and outputs as 220 generated complete/incomplete blocks and summaries of those blocks, both of which attempt to provide the original input problem descriptions/summaries of 202. In addition, the constructor 216 outputs probabilities 218 that the generated blocks are complete or incomplete. This can be done by comparing output 220 to input 202, for instance the output blocks to the original, complete input blocks and/or the output problem summaries to the input problem summaries. In this manner, the constructor network 216 generates probabilities indicating how 'good' the incomplete blocks are; if the problem intent of a block is identified with high confidence as "WiFi Internet Connection Issue" (using the example above), then this is in reality a complete block rather than an incomplete one, but the intent "Internet connection issue" is incomplete to some extent.

Thereby provided by FIG. 2 is a set of generated new data, e.g. of complete and incomplete problem descriptions, akin to labeled user-generated data.

As noted, feedback 224 to the de-constructor network 206 helps to train it to generate good output, i.e. properly incomplete problem descriptions. The model can take time to learn to generate statements forming incomplete and complete blocks based on the feedback loop. The model might generate the following for example: "Cannot connect to internet", "Laptop's WIFI", "LAN Cable", <End-Marker>, which may be constructed into a sequence that is not quite the exact same as the original input of "I cannot connect to the internet through my laptop's WIFI but I am able to connect when using a LAN cable." The feedback 224 to the de-constructor network 206 will help learn from this, for instance to inform adjustment to the de-constructor's weightings to regenerate statements, again send to the constructor for summarization and further feedback, etc. The loop continues and the model learns to optimally deconstruct input and construct accurate output.

The de-constructor network 206, output 210 thereof, and validation of that output by validator 212 using the input (historical) data 214 works to generate new blocks (via 216) both incomplete and complete in terms of the problem description. In specific examples, generated blocks are summarized in terms of the problem they describe and those summaries (included as part of 220) are compared to input summaries (included as part of 202) to determine how closely the problem summaries align. This informs how well the network is deconstructing input and constructing output to produce useful data for training to recognize complete and incomplete blocks as well as the intents of the blocks.

Accordingly, provided herein are methodologies to enable virtual assistants/agents to recognize incomplete problem descriptions. This is provided by way of a machine learning/cognitive model (using an RNN network as one example) that identifies whether sequences of words/sentences provide incomplete problems descriptions, and delayed processing of user utterances (typed or spoken) based on a determination that the user continues to use (i.e. without an uninterrupted pause for a threshold amount of time) an input device like a keyboard or microphone. For instance a system can listen for keystrokes or microphone input and buffer user input while either is active, before then feeding the accumulated, buffered user input into the cognitive model for determination of problem description completeness. It is further provided by way of continuously learning from user utterances (typed or spoken) provided after the virtual assistant provides a response to the user's request/problem description, as a way of determining whether the system understood the request (i.e., identified the proper intent(s)) and properly determined whether the problem description initially provided was complete. For instance, this could include determining whether the user continues to provide additional input/interact with the virtual assistant about the same problem that was just described, and if so, retrain the cognitive model to include that additional input as new statement(s) into the existing block in order to improve accuracy of the cognitive model. Additionally provided are methodologies for identifying whether sequences of words/sentences provide incomplete problems descriptions way of (i) processing an existing set of interactions between users and human agents generate proper sequences of words to form chunks/statements, and proper sequences of chunks/statements to form blocks, with the blocks representing complete problem descriptions; (ii) processing properly generated blocks to generate incomplete blocks by removing sequence(s) of chunks/statements from the blocks and labeling those blocks as incomplete problems descriptions; (iii) creating datasets using complete and incomplete blocks; (iv) using an RNN network to train a cognitive model that classifies statements/sequences of statements as incomplete or complete problem descriptions; and (v) using a multi-class classifier to identify possible problem intents of statement blocks.

In some aspects, multiple text sentences/statements can be generated from a single sentence/statement (e.g. problem summary), as a form of reverse text summarization. For instance, the following: "CPU not working", could provide a complete problem description to be diagnosed and addressed. From that sequence of words, the de-constructor 206, sentence similarity validator 212, and constructor 216 might generate multiple incomplete problem descriptions (e.g. as individual statements or blocks of multiple statements) that relate to a CPU not working but that fail to completely identify that the CPU malfunction is the problem. Example sentences are "My computer is stuck", "My screen won't load", and "Video is slow". A unique neural net can be created for this purpose, providing a deconstruction network to deconstruct summary text to details, for instance a generative network to generate multiple sequences of statements (blocks) that eventually result in the same meaning as the summary text, and using word embeddings to generate words and form sentences without changing the meaning of the original problem stated in the way of the summary text.

Further in this approach, sequences of statements can be classified as being incomplete or complete problem descriptions. The blocks generated as above can be taken as input along with the text summaries used to generate the blocks and fed into a construction network used to summarize the generated text. The summary text can be the same as or at least substantially similar to (using some quantitative measure) the original text summary. This construction network can also emit an intermediate state that indicates a probability as to whether the previous passed block provides a complete or incomplete problem description. The construction network can also handle a stream of sentences/statements until an end of block marker is received before it clears its state to then work on a next problem description.

Aspects of the above combine de-construction and construction networks for deconstructing sequences of sentences/statements, constructing sequences of similar sentences/statements based on the deconstruction, and generating an intermediate state that provides probabilities the sequences of statements are complete or incomplete. It may be a goal to form blocks of statements that are incomplete problem descriptions to facilitate accurate training of the cognitive model.

When in production with a virtual assistant, a process determines completeness in part by monitoring input devices (e.g. keyboards, microphones) and, if continuing to receive input from a user, assuming that the user has not completed the problem description and continuing to buffer the input until the user has stopped providing input on the input device(s) for a threshold amount of time. Further, model accuracy is determined in part based on whether users continue to state details about the same problem even after solution responses have been identified and provided to the user as a resolution. The cognitive model can be retrained based on this feedback.

There are multiple channels of feedback for retraining. For instance, the time gap between a sequence of statements typed/spoken by a user provides an implicit feedback in determining whether or not a user input is a complete problem description. If a user provides an incomplete problem description, then the system can prompt for additional input and during this time the user might provide clarification as to what the true problem is. This data can be used to train the model to identify appropriate incomplete problem descriptions. Additionally, there is explicit feedback in the form of input received from the user after the assistant has provided a response attempting to address the assistant-perceived problem from the user's initial problem description. If the system determines that the sequence of statements describes a complete problem, then it can communicate back to the user indicating such, and perhaps provide a summary of the perceived problem. The user can provide feedback as to whether or not the system properly understood the problem. If not, the system can prompt for more information from the user and this can be used for retraining the cognitive model that identifies complete/incomplete problem descriptions. In addition, there is explicit feedback as to whether a provided initial resolution actually assisted the user in resolving the perceived problem. Th user can indicate whether the resolution was useful, and this can be used to retrain the classifier to properly determine intents of a problem description.

One goal of aspects described herein is to provide a virtual assistant that properly identifies instances when users have provided incomplete problem descriptions, and, before providing an initial response, automatically prompting the user for more information about the problem being described until the model confidently classifies the input statements as providing a complete problem description. A complete problem description provides a well-defined request for assistance that the virtual assistant can then process to determine a response in an effort to diagnose and help to address the user's problem.

Figure 3:
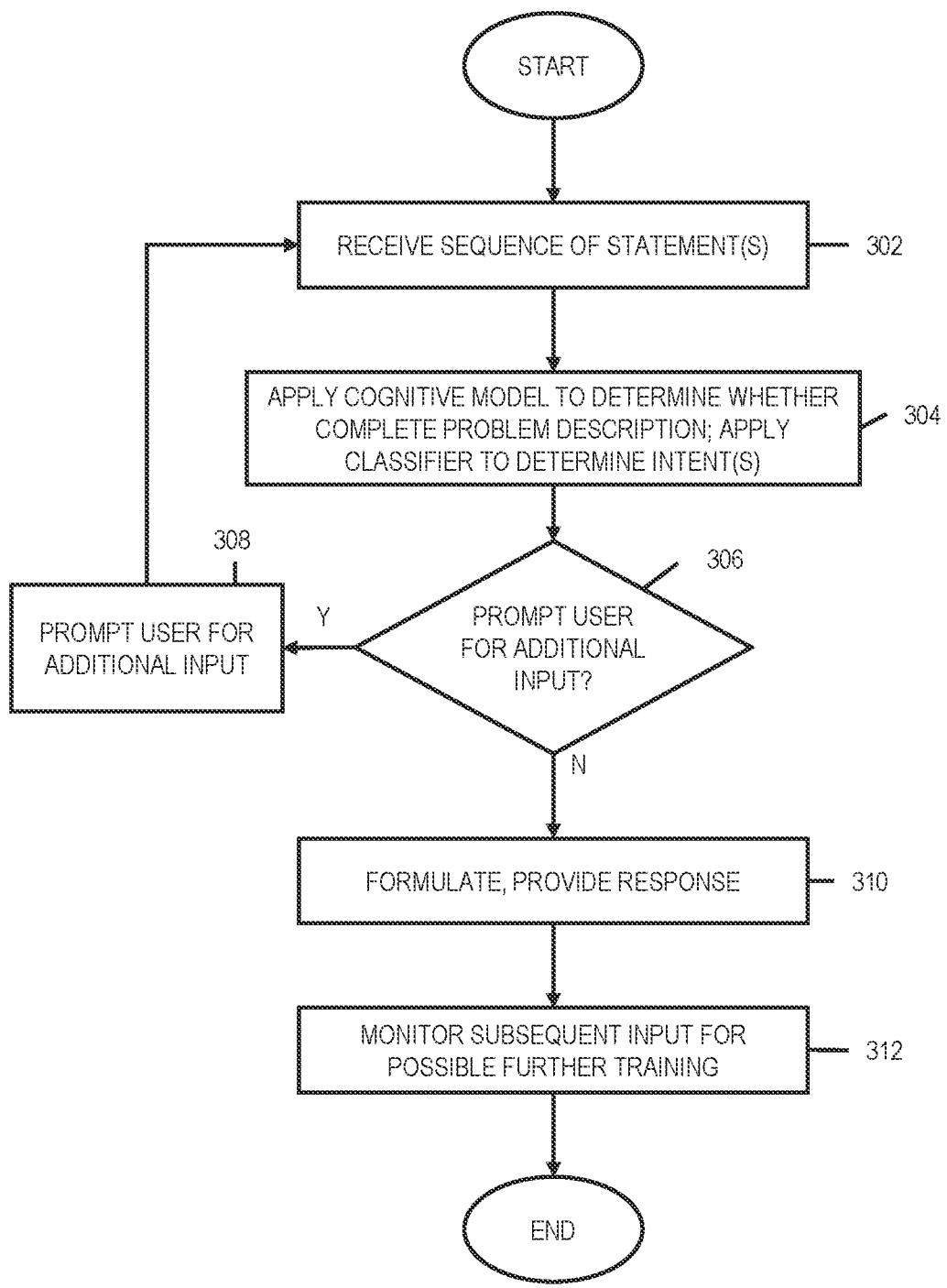
FIG. 3 depicts an example process for user input handling by a virtual assistant, in accordance with aspects described herein.

FIG. 3 depicts an example process for user input handling by a virtual assistant, in accordance with aspects described herein. In some examples, the process is performed by one or more computer systems, such as those described herein, which may include one or more smart speakers, cloud servers, or other computer systems providing virtual assistant and/or artificial intelligence processing.

The process includes receiving (302) a sequence of natural language statements provided by a user to a virtual assistant. A natural language statement is a series/chunk of words in a natural language, such as English. A statement may or may not form a grammatically proper sentence, with or without punctuation. A sequence of statements is a block of one or more statements input by a user via input devices such as microphones or keyboards (either physical or virtual). As part of receiving the sequence of statements by the user, the process can, as the user provides the statements of the sequence, determine, based on a property of the user input, whether the user continues to provide additional statements to be included in the sequence of statements. Thus, the process can continually determine as the user provides input whether the user continues to provide additional input. The process waits to proceed with other aspects of the process (such as applying a cognitive model) until it is determined that the user has concluded providing statements to be included in the sequence of statements. An example property of the user input includes an amount of time that elapses, without further user input, after the user provides keystroke input and/or the user speaks voice input. This may use a timer to track the amount of time between each keystroke or spoken word/sound. A threshold amount of time can define how long the system will wait for further user input before proceeding to the next stage of analysis. If the threshold is 4 seconds and the user is typing statement(s) using a keyboard, then the process will wait until 4 seconds elapses between keystrokes before it will regard the user as having stopped typing/providing input to include in the sequence.

The process proceeds by applying (304) a cognitive model, such as an RNN-trained symptom summarizer, to the sequence of statements and determining whether the sequence of statements provides a complete problem description, input by the user, to which the virtual assistant is to respond in assisting the user address a problem that the user experiences and optionally at that point applying a classifier to determine intent(s) of the sequence of statements. The process determines (306) based on applying the cognitive model and/or classifier whether to prompt the user for additional input. For instance, the process might determine that the sequence does not provide a complete problem description and that it is necessary to prompt the user to provide additional input statement(s) in an effort to complete the description. Additionally or alternatively, the process might determine that the sequence informs too many intents and/or no intent(s) with a high-enough confidence (above a threshold confidence level). If it is determined to prompt for additional input (306, Y) then the process regards the input sequence as an initial or preliminary sequence/set statements, and proceeds by prompting (308) the user to provide additional input, for instance that further describes the problem. The process returns to 302 to receive (additional) statement(s) from the user. These additional statement(s) are combined with the initial/preliminary sequence to form an updated sequence of statements to which the process applies the cognitive model/classifier (at 304) to determine whether that updated sequence provides a complete problem description and/or intent(s) of the updated sequence. In this manner, the process can loop one or more times to prompt the user for additional information if the cognitive model responds that the sequence is not a complete problem description and/or the classifier is unable to confidently identify intent(s).

In a specific example, the process of FIG. 3 applies the classifier to the sequence of statements and determines a plurality of candidate intents of the sequence of statements. Prompting the user (308) can include asking the user one or more clarifying questions, for instance question(s) that are formulated specifically based on one or more of the plurality of intents. The question(s) can be formulated to solicit from the user additional statement(s) to complete the problem description, where the classifier, after the process loops back through 302 to 304, identifies one intent, of the previously identified plurality of intents, as the true intent behind the user's request and that the sequence provides a complete problem description.

If not prompting for additional input (306, N), the process, based on a determined intent, formulates and provides (312) a response to the user.

The classifier might identify more than one intent from the problem description, in which case the system could take any desired approach for responding. For instance, it could prompt for additional input (by returning to 308) or work through the intents one-by-one by providing a response and seeing how the user responds in order to gather additional feedback for potential further training.

In any case, the process, based on providing a response, can monitor (312) input by the user based on having provided the response, with the input informing feedback for further training, for instance training of the cognitive model to identify whether statement sequences provide complete or incomplete problem descriptions and/or training of the classifier to identify intents from problem descriptions. Thus, the monitoring (312) can monitor for further input pertaining to the problem, where the further input is provided for retraining the cognitive model to properly identify complete and incomplete problem descriptions and/or for retraining the classifier to properly determine intents of problem descriptions.

If the classifier confidently classifies the intent(s) of an incomplete problem description and the process decides to proceed to 310 after which (by way of 312) it is confirmed that the classification of the intent was correct, then that problem description originally classified as incomplete may be labeled as a complete problem description for training purposes in order to update the cognitive model during a retraining phase.

Figure 4:
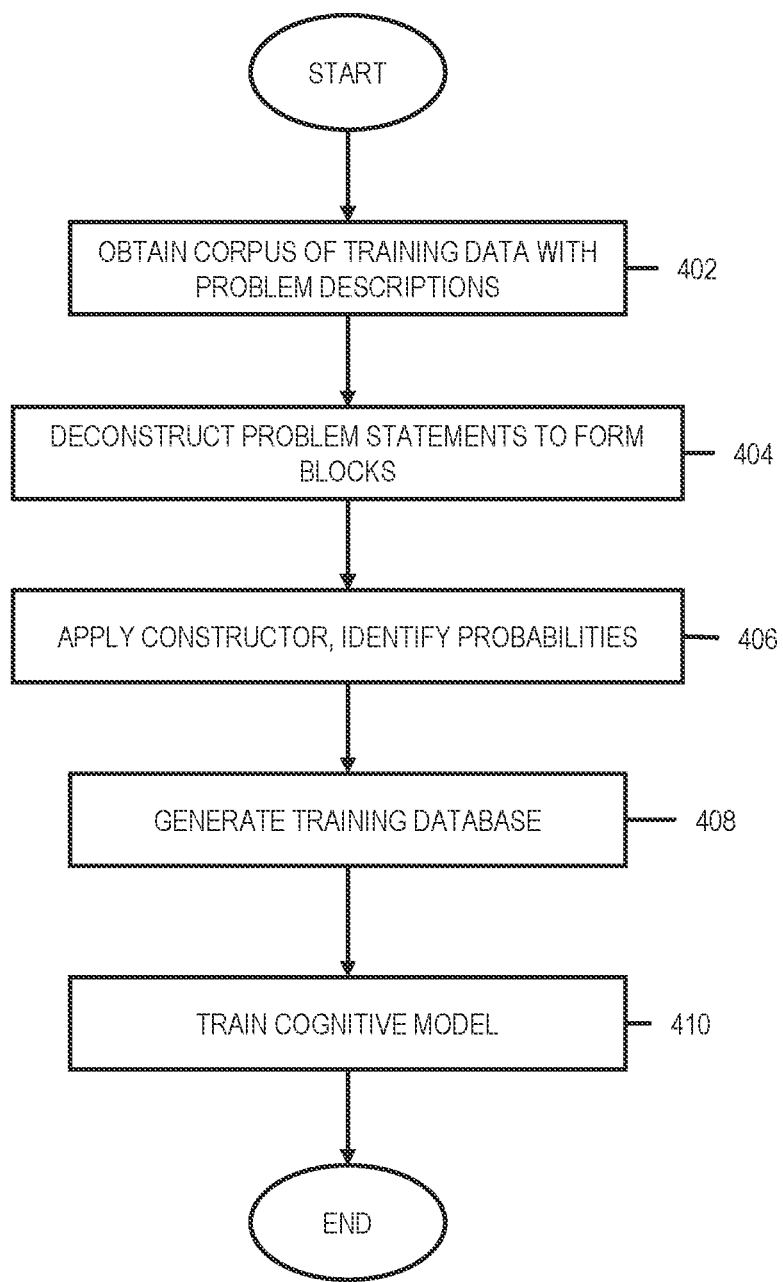
FIG. 4 depicts an example process for building and training a model for classifying completeness of input statements, in accordance with aspects described herein.

FIG. 4 depicts an example process for building and training a model for classifying completeness of input statements, in accordance with aspects described herein. The process obtains (402) a corpus of training data that includes complete problem descriptions and deconstructs (404) those problem descriptions to form blocks of statements. At least some of the formed blocks of statements provide incomplete problem descriptions from/based on the complete problem descriptions of the input corpus. The deconstructing can include removing, from at least some of the complete problem descriptions, chunks of words to produce at least some of the formed blocks of statements as incomplete problem descriptions. Continuing with the process of FIG. 4, the process applies (406) a constructor to summarize the formed blocks of statements and identify probabilities that the blocks of statements provide incomplete problem descriptions. The process generates (408) a training database by storing the formed blocks with labels indicating formed blocks that are incomplete problem descriptions and optionally formed blocks that are complete problem descriptions, and then trains (410) the cognitive model, using the blocks of statements, to identify whether input statements provide a complete problem description.

It is also noted that the corpus of training data obtained at 402 could be used to build and train the intent classifier to identify intents of problem descriptions.

Although various examples are provided, variations are possible without departing from a spirit of the claimed aspects.

Figure 5:
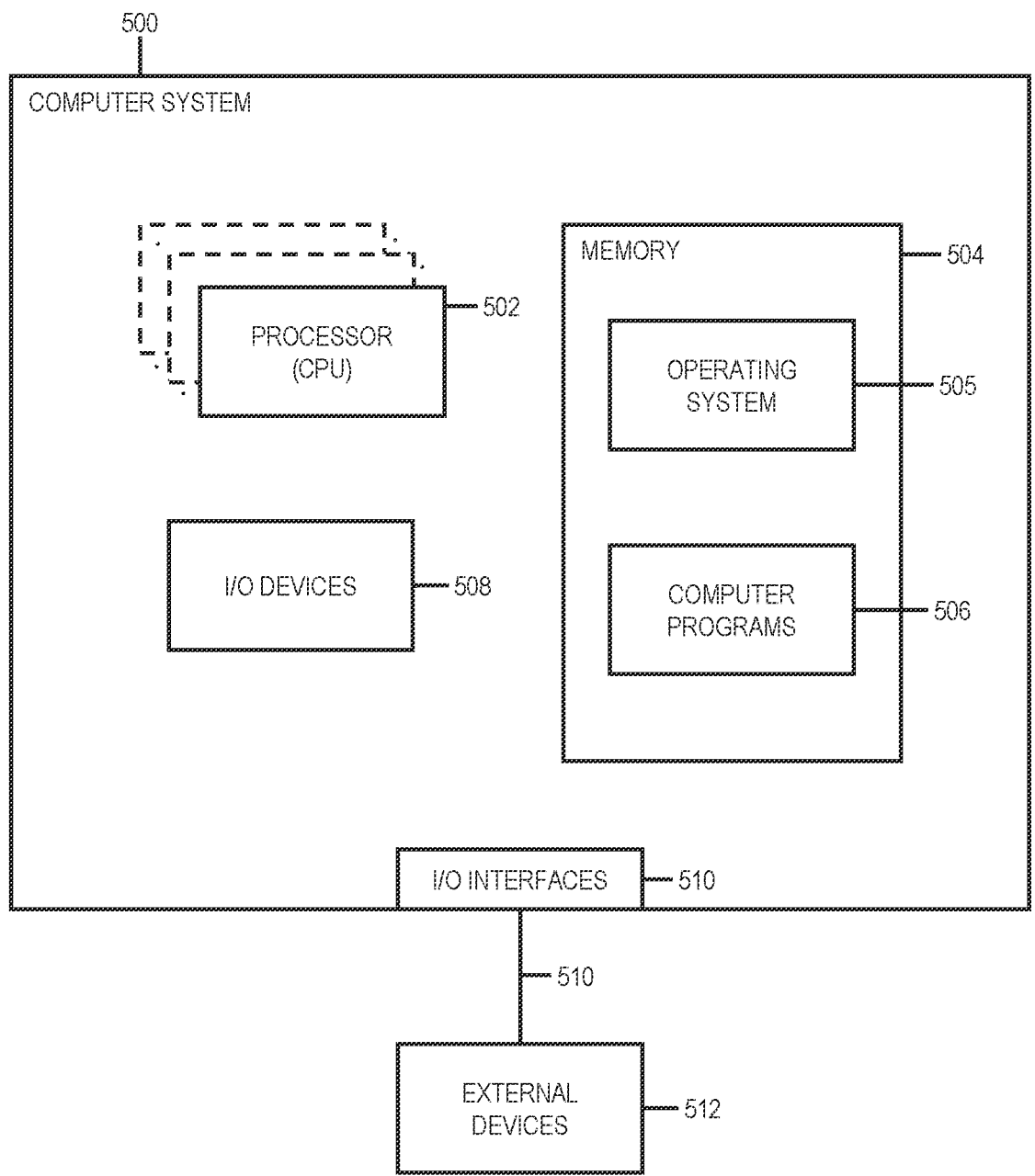
FIG. 5 depicts one example of a computer system and associated devices to incorporate and/or use aspects described herein.

Processes described herein may be performed singly or collectively by one or more computer systems, such as one or more virtual assistant devices such as smart speaker devices or mobile devices, one or more cloud servers, or a combination of the foregoing, as examples. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, New York, USA), Intel Corporation (Santa Clara, California, USA) or ARM Holdings plc (Cambridge, England, United Kingdom), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive (s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
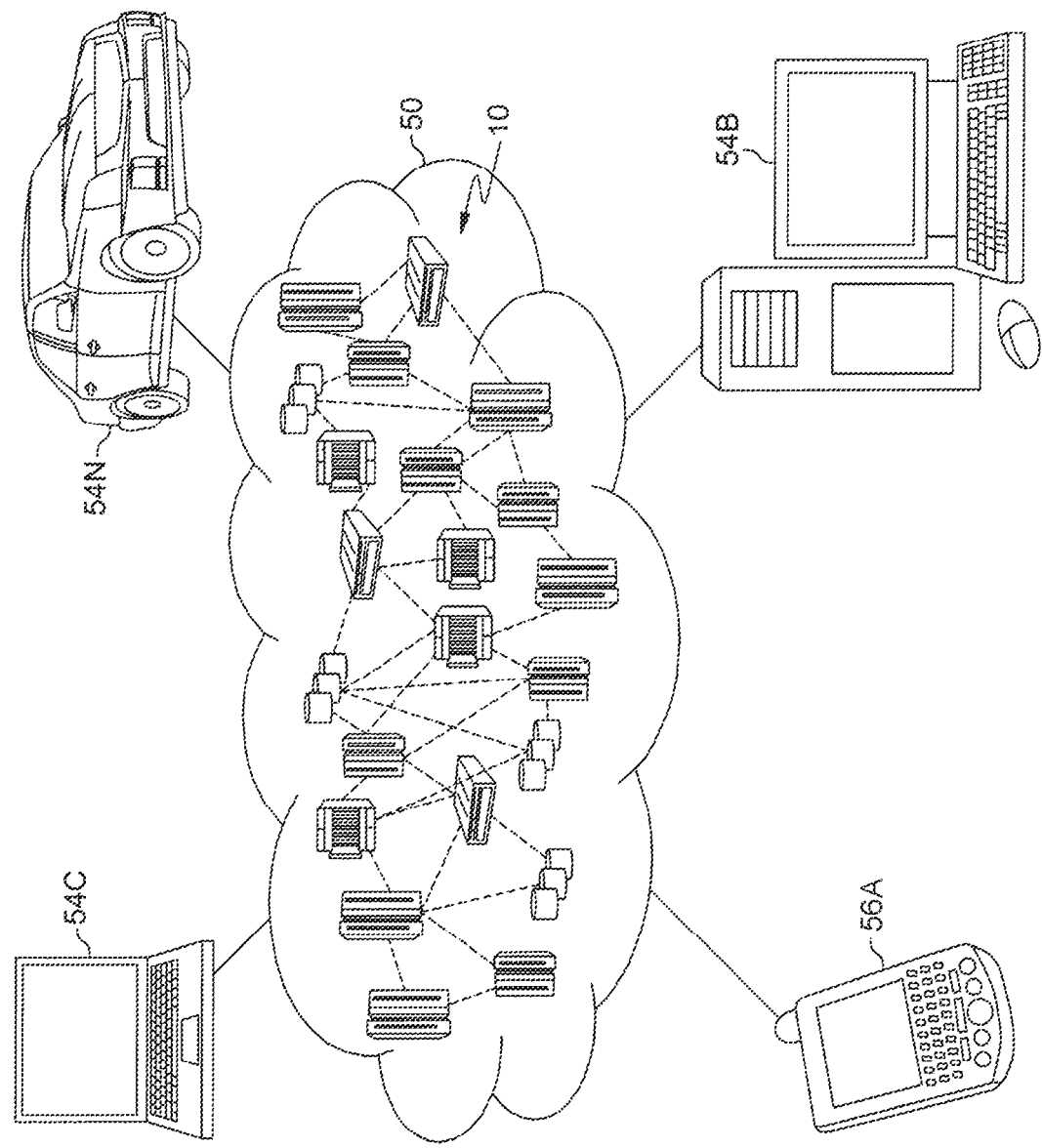
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
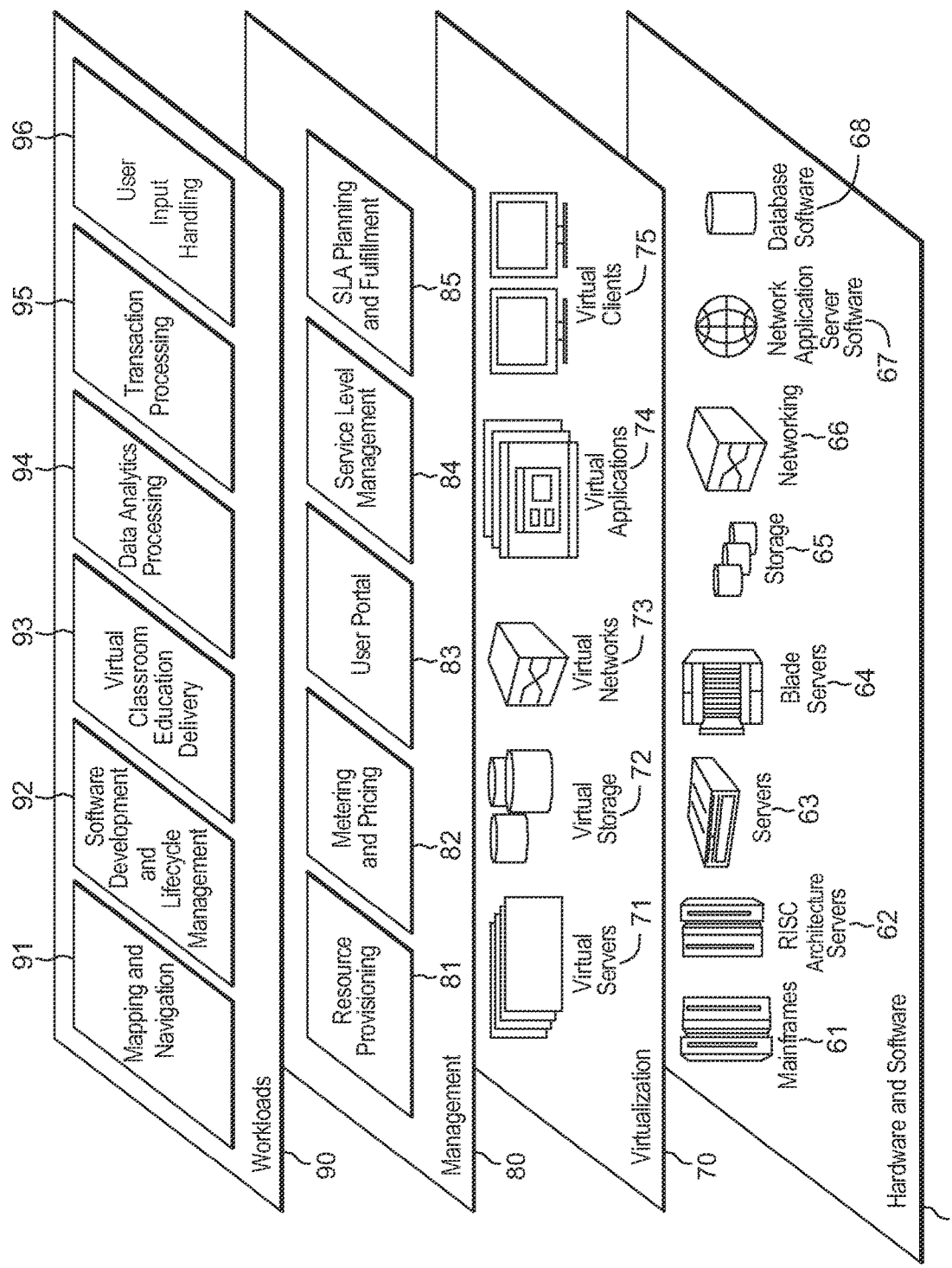
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual assistant handling of user input 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   building and training a cognitive model, the building and training comprising:
     obtaining a corpus of training data comprising complete training problem descriptions;
     deconstructing the complete training problem descriptions to form blocks of statements, at least some of the formed blocks of statements providing incomplete training problem descriptions from the complete training problem descriptions;
     applying a constructor to summarize the formed blocks of statements and identify probabilities that the blocks of statements provide incomplete training problem descriptions; and
     training the cognitive model, using the blocks of statements, to identify whether an input statement provides a complete problem description;
   receiving a sequence of natural language statements provided by a user to a virtual assistant;
   applying the cognitive model to the sequence of statements and determining whether the sequence of statements provides a first complete problem description, by the user, to which the virtual assistant is to respond in assisting the user address a problem that the user experiences;
   prompting the user to provide an additional one or more statements to complete the first problem description;
   based on completing the first problem description, formulating and providing a response to the user based on a determined intent of the complete first problem description; and
   monitoring input by the user based on providing the response, the input informing feedback for further training of the cognitive model to identify whether statement sequences provide complete or incomplete problem descriptions.

2. The method of claim 1, further comprising applying a classifier to the sequence of statements and determining a plurality of candidate intents of the sequence of statements, wherein the prompting comprises asking the user one or more clarifying questions based on at least one of the plurality of intents, the one or more clarifying questions formulated to solicit from the user the additional one or more statements to complete the first problem description, wherein the classifier identifies one intent, of the plurality of intents, as the determined intent of the complete first problem description.

3. The method of claim 1, wherein the receiving the sequence of statements provided by the user comprises, as the user provides the statements of the sequence, determining, based on a property of user input, whether the user continues to provide additional statements to be included in the sequence of statements.

4. The method of claim 3, wherein the method waits to apply the cognitive model until the user has concluded providing additional statements to be included in the sequence of statements.

5. The method of claim 4, wherein the property of the user input comprises an amount of time elapsing, without further user input, after at least one selected from the group consisting of: the user providing additional keystroke input and the user speaking additional voice input.

6. The method of claim 1, wherein the applying the cognitive model determines that the sequence of statements provides an incomplete first problem description, and wherein the prompting is performed based on determining that the sequence of statements provides an incomplete first problem description.

7. The method of claim 1, further comprising generating a training database by storing the formed blocks with labels indicating which of the formed blocks are incomplete training problem descriptions and which are complete problem descriptions.

8. The method of claim 1, further comprising building and training the classifier based on the corpus of training data to identify intents of training problem descriptions.

9. The method of claim 1, wherein the deconstructing comprises removing, from at least some of the complete problem descriptions, chunks of words to produce at least some of the formed blocks of statements as incomplete problem descriptions.

10. The method of claim 1, wherein the monitoring input by the user based on providing the response comprises monitoring for further input pertaining to the problem, wherein the further input is provided for retraining the cognitive model to properly identify complete and incomplete problem descriptions and for retraining the classifier to properly determine intents of problem descriptions.

11. A computer system comprising:
a memory; and
a processor in communication with the memory, wherein the computer system is configured to perform a method comprising:
building and training a cognitive model, the building and training comprising:
obtaining a corpus of training data comprising complete training problem descriptions;
deconstructing the complete training problem descriptions to form blocks of statements, at least some of the formed blocks of statements providing incomplete training problem descriptions from the complete training problem descriptions;
applying a constructor to summarize the formed blocks of statements and identify probabilities that the blocs of statements provide incomplete training problem descriptions; and
training the cognitive model, using the blocks of statements, to identify whether an input statement provides a complete problem description;
receiving a sequence of natural language statements provided by a user to a virtual assistant;
applying the cognitive model to the sequence of statements and determining whether the sequence of statements provides a first complete problem description, by the user, to which the virtual assistant is to respond in assisting the user address a problem that the user experiences;
prompting the user to provide an additional one or more statements to complete the first problem description;
based on completing the first problem description, formulating and providing a response to the user based on a determined intent of the complete first problem description; and
monitoring input by the user based on providing the response, the input informing feedback for further training of the cognitive model to identify whether statement sequences provide complete or incomplete problem descriptions.

12. The computer system of claim 11, wherein the method further comprises applying a classifier to the sequence of statements and determining a plurality of candidate intents of the sequence of statements, wherein the prompting comprises asking the user one or more clarifying questions based on at least one of the plurality of intents, the one or more clarifying questions formulated to solicit from the user the additional one or more statements to complete the first problem description, wherein the classifier identifies one intent, of the plurality of intents, as the determined intent of the complete first problem description.

13. The computer system of claim 11, wherein the receiving the sequence of statements provided by the user comprises, as the user provides the statements of the sequence, determining, based on a property of user input, whether the user continues to provide additional statements to be included in the sequence of statements, wherein the method waits to apply the cognitive model until the user has concluded providing additional statements to be included in the sequence of statements, and wherein the property of the user input comprises an amount of time elapsing, without further user input, after at least one selected from the group consisting of: the user providing additional keystroke input and the user speaking additional voice input.

14. The computer system of claim 11, wherein the applying the cognitive model determines that the sequence of statements provides an incomplete problem description, and wherein the prompting is performed based on determining that the sequence of statements provides an incomplete first problem description.

15. A computer program product comprising:
a computer readable storage medium readable by a processing circuit and storing instructions for execution by the processing circuit for performing a method comprising:
building and training a cognitive model, the building and training comprising:
obtaining a corpus of training data comprising complete training problem descriptions;
deconstructing the complete training problem descriptions to form blocks of statements, at least some of the formed blocks of statements providing incomplete training problem descriptions from the complete training problem descriptions;
applying a constructor to summarize the formed blocks of statements and identify probabilities that the blocks of statements provide incomplete training problem descriptions; and
training the cognitive model, using the blocks of statements, to identify whether an input statement provides a complete problem description;
receiving a sequence of natural language statements provided by a user to a virtual assistant;
applying the cognitive model to the sequence of statements and determining whether the sequence of statements provides a first complete problem description, by the user, to which the virtual assistant is to respond in assisting the user address a problem that the user experiences;
prompting the user to provide an additional one or more statements to complete the first problem description;
based on completing the first problem description, formulating and providing a response to the user based on a determined intent of the complete first problem description; and
monitoring input by the user based on providing the response, the input informing feedback for further training of the cognitive model to identify whether statement sequences provide complete or incomplete problem descriptions.

16. The computer program product of claim 15, wherein the method further comprises applying a classifier to the sequence of statements and determining a plurality of candidate intents of the sequence of statements, wherein the prompting comprises asking the user one or more clarifying questions based on at least one of the plurality of intents, the one or more clarifying questions formulated to solicit from the user the additional one or more statements to complete the first problem description, wherein the classifier identifies one intent, of the plurality of intents, as the determined intent of the complete first problem description.

17. The computer program product of claim 15, wherein the receiving the sequence of statements provided by the user comprises, as the user provides the statements of the sequence, determining, based on a property of user input, whether the user continues to provide additional statements to be included in the sequence of statements, wherein the method waits to apply the cognitive model until the user has concluded providing additional statements to be included in the sequence of statements, and wherein the property of the user input comprises an amount of time elapsing, without further user input, after at least one selected from the group consisting of: the user providing additional keystroke input and the user speaking additional voice input.

18. The computer program product of claim 15, wherein the applying the cognitive model determines that the sequence of statements provides an incomplete first problem description, and wherein the prompting is performed based on determining that the sequence of statements provides an incomplete first problem description.

19. The computer system of claim 11, wherein the intent of the complete first problem description is determined by an intent classifier, wherein the intent classifier is trained using the obtained corpus of training data comprising the complete training problem descriptions.

20. The computer program product of claim 15, wherein the intent of the complete first problem description is determined by an intent classifier, wherein the intent classifier is trained using the obtained corpus of training data comprising the complete training problem descriptions.

* * * * *